United States Patent Office 3,474,661
Patented Oct. 28, 1969

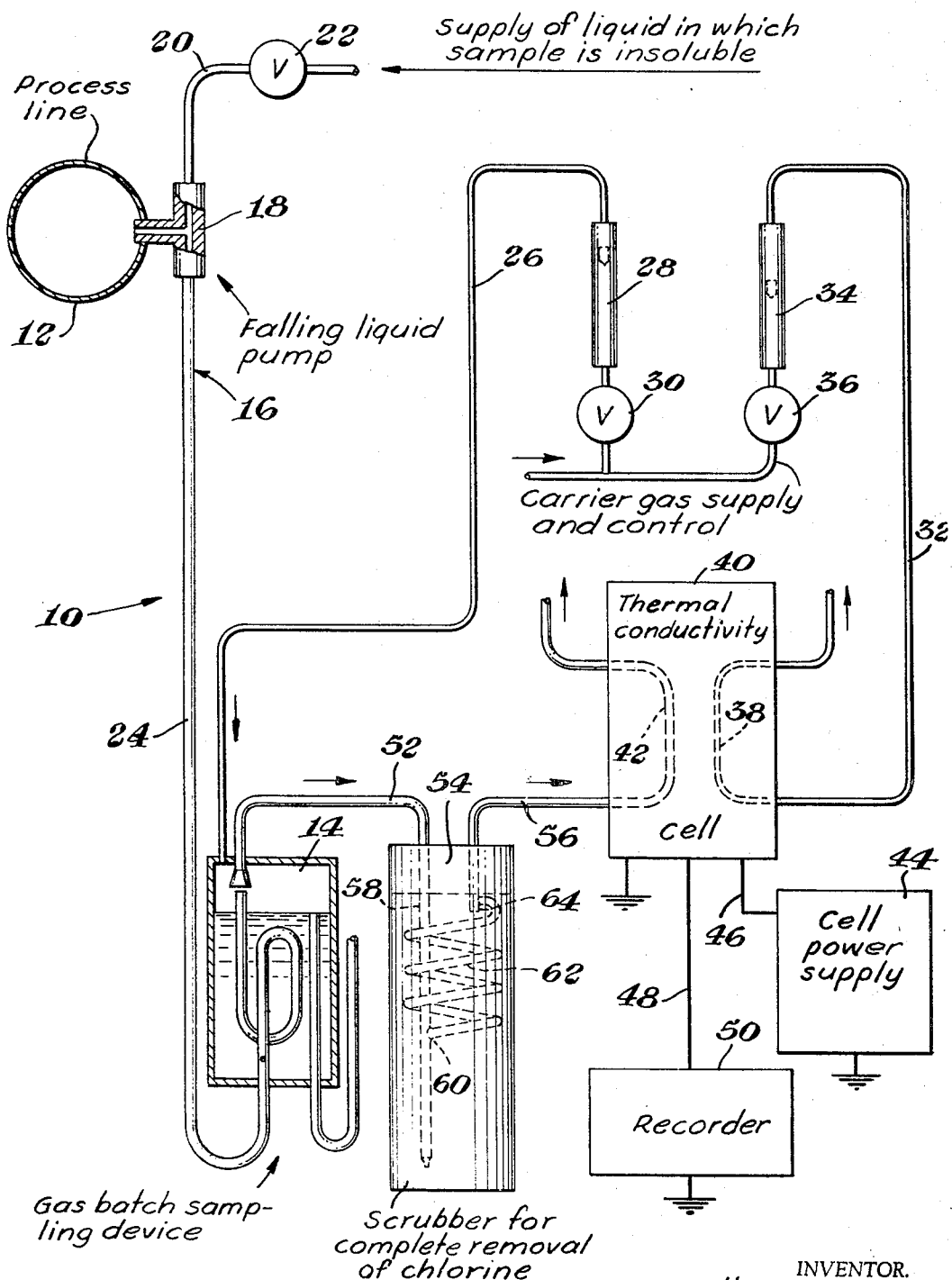

3,474,661
ANALYZER FOR DETERMINATION OF HYDROGEN IN CHLORINE OR FOR DETERMINATION OF INERTS IN CHLORINE
Walter F. Gerdes, Lake Jackson, Tex., assignor to The Dow Chemical Company, Midland, Mich., a corporation of Delaware
Filed Aug. 7, 1967, Ser. No. 658,770
Int. Cl. G01n *31/00*
U.S. Cl. 73—27
9 Claims

ABSTRACT OF THE DISCLOSURE

The invention relates to an analytical instrument for the purpose of continuously, on an intermittent basis, monitoring the percentage of hydrogen in chlorine or the percentage of inert gases in chlorine. The principle of operation is similar to gas chromatography in that a volumetric sample of the gas to be analyzed is injected into a stream of carrier gas and the ultimate analysis depends upon a measurement of the thermal conductivity of the carrier gas with the injected sample. However, it differs significantly from chromatography in that a scrubber is used to remove completely the chlorine after its injection into the carrier stream, and hence no partitioning column is needed. The scrubber takes the place of the customary partitioning column. A further difference comes from the use of a gas batch sampling device which makes unnecessary a timer or programmer for controlling the injection of the sample. To measure hydrogen in chlorine containing also some air, an air carrier is used and the instrument reading is percentage of hydrogen in the process gas. To measure inerts in chlorine containing also some hydrogen, a hydrogen carrier is used and the instrument reading is percentage of inerts other than hydrogen in the process gas.

---

This invention relates to apparatus for monitoring the percentage of hydrogen in chlorine or the percentage of inert gases in chlorine, and particularly to apparatus making such measurements while using a conventional type thermal conductivity cell.

Presently the measurement of hydrogen in chlorine is made by differential thermal conductivity means. Apparatus for this purpose consists of a thermal conductivity cell made of materials resistant to chlorine, which necessitates the use of glass coated filaments or the equivalent. The process gas is first directed through one side of the thermal conductivity cell, then the reaction of hydrogen with chlorine is promoted by the use of a heated chamber or by exposure to ultraviolet light, and after the temperature is restored approximately to the initial conditions the reacted gas is directed through the second side of the cell. The difference in thermal conductivity and hence the readout of the analyzer is proportional to the volume percentage of hydrogen in the process gas. The principal difficulty with this arises from the fact that the transit time through the analyzer plus time constants of various parts result in a delay in obtaining the analysis which is typically several minutes.

A further difficulty is uncertainty in the reading which may result from various factors which unbalance the cell, since such errors are revealed only by a manual zero check on the instrument.

A further difficulty arises from special conditions surrounding the process—namely that the process gas is usually at a pressure below atmospheric and some type of pump or aspirator must be used to cause a sample to flow into the analyzer. This may result in variable pressure on the analyzer, which adds further to the uncertainty in the reading.

Accordingly, a principal object of this invention is to provide improved apparatus for monitoring the amount of hydrogen or of inert gases in chlorine.

Another object of this invention is to provide improved, faster acting apparatus for monitoring the amount of hydrogen or of inert gases in chlorine.

A further object of this invention is to provide simple, more reliable apparatus for monitoring the amount of hydrogen or of inert gases in chlorine.

In accordance with this invention chlorine gas from a process sample line, for example, and a carrier gas, are fed, at a suitable rate, into a gas batch sampling device, thence through a scrubber where the chlorine is removed, and then through one side of a conventional bridge type thermal conductivity cell while carrier gas at suitable pressure and rate passes through the other side of the cell. The electrical output of the thermal conductivity cell is coupled to a readout means such as a chart recorder. The invention, as well as additional objects and advantages thereof, will best be understood when the following detailed description is read in connection with the accompanying drawings in which the single figure shows, in diagrammatical form, apparatus in accordance with this invention.

Referring to the drawing, there is shown apparatus, indicated generally by the numeral 10, in accordance with this invention, which is coupled to a process line 12, or other source of gas to be monitored for contaminants.

Gas from the process line 12 is fed to a gas batch sampling device 14 of the type disclosed and claimed in my co-pending application Ser. No. 607,717, filed Jan. 6, 1967, for Gas Sample Injection Apparatus, in which, within a closed vessel, a trap-accumulator is provided in which liquid components of the sample to be introduced are separated and the gas accumulated, the accumulated gas being dumped when a predetermined volume is reached.

A falling liquid pump 16 coupled to the process line 12 by means of a T element 18 and through tubing 20 and valve 22 to a supply of liquid in which the sample gas is insoluble. The long vertical leg of the pump is coupled to the sample input of the sampling device 14.

Gas from a carrier gas supply is coupled to the top of the gas sampling device 14 through tubing 26, flow meter 28, and a valve 30. Carrier gas is also coupled through tubing 32, flow meter 34 and valve 36 to the "reference" section 38 of a conventional thermal conductivity cell 40 in which the "reference" section and "sample" section 42 of the cell each include a filament which is part of an electrical bridge circuit, as is well known in the art.

A power supply 44 is provided for the electrical operation of the cell 40 and is coupled to the cell 40 by means of cable 46. The electrical output of the cell 40 is coupled through a cable 48 to a readout device such as a chart recorder 50, for example.

Returning now to the gas batch sampling device, the output tube 52 of that device is coupled to the input of a scrubber device 54 whose function is to remove all chlorine from the gas. The chlorine-free gas leaving the output of the device is coupled to the sample section of the thermal conductivity cell through the tubing 56.

In operation, the falling liquid pump 16 is fed a supply of brine which is a lesser amount than would flow down the vertical tube 24 by gravity if the tube were fed an unlimited supply of brine at atmospheric pressure. The result is that process gas (chlorine) from the main line 12 which is below atmospheric pressure is drawn into the vertical tube 24. The presence of the gas in small slugs interspersed with similar slugs of liquid increases the friction impeding flow down the tube 24 and also reduces the gravitational force impelling flow down the tube, Thus, an equilibrium is established in which the product of volume flow rate of fluid in the tube 24 and percentage of liquid in the fluid is equal to the supply of brine fed in at the top. During their transit down the vertical tube 24, the slugs of gas are compressed to whatever pressure exists at the outlet of the tube. In our case this is a few inches of water above atmospheric pressure. Transit time down the tube is typically 15–20 seconds for the $\frac{1}{16}$ inch ID Teflon tubing commonly used.

In the batch sampling device 14 the carrier gas from tube 26 flows across the free surface of the liquid in the enclosure and the sample gas plus liquid enters the trap-accumulator from the bottom. Periodically sufficient sample gas accumulates to blow the seal and then a batch of sample gas leaves the trap and enters the stream of carrier gas. Volume of this sample is typically 1 milliliter. The carrier gas flow rate commonly used is 60 to 100 milliliters per minute.

The scrubber 54 is a gas-lift type device in which the carrier gas containing discrete slugs of sample gas is directed down a vertical tube 58 where it picks up discrete slugs of liquid which are being forced into the gas stream by the hydraulic head existing at a lower T junction 60 at the bottom of an upwardly extending coil of glass tubing, for example. The stream of gas containing slugs of liquid proceeds up the coiled portion 62 of the scrubber to an upper separator 64 where the liquid falls out and the scrubbed gas proceeds. If the coil is made of glass or of some material easily wetted by the scrubber liquid, scrubbing action is very efficient and spatial resolution of the device is excellent.

That is, little turbulence exists in the scrubber so that discrete slugs of sample gas entering the scrubber emerge as still discrete slugs but with the chlorine component removed. Liquid used in the scrubber may be 10–15 percent sodium hydroxide in water solution or this may have added to it several percent of sodium sulfite, if desired.

In the thermal conductivity cell the carrier gas flows past a set of heated filaments (not shown) in the sample section 42 while a stream of similar gas but without the slugs of sample flows past a similar set of heated filaments in the reference section 38. In the absence of sample gas the two sides of the cell are in a symmetrical configuration and the electrical bridge made up of the filaments is balanced so that the recorder reads zero. Presence in the carrier stream of a slug of sample gas having a thermal conductivity different from that of the carrier results in a momentary unbalance of the bridge and the recorder 50 registers a deviation or a peak. Height of this peak is generally proportional to the product of these three factors: the size of the sample slug, to the concentration of gas in the sample having a different thermal conductivity from that of the carrier, and to the degree of this difference in thermal conductivities. This permits an empirical calibration of the analyzer in volume percent of hydrogen in the process gas, or of inerts in the process gas.

If it is desired to measure hydrogen in the process gas, the carrier gas is air or nitrogen. With this arrangement, after absorption of the chlorine from a sample slug the gases remaining in the slug are principally hydrogen having a thermal conductivity roughly ten times that of air, and inerts having almost the identical thermal conductivity of air. Thus the unbalance of the detector is proportional to the (fixed) sample size, the (fixed) difference in thermal conductivity between air and hydrogen, and the (variable) concentration of hydrogen in the original sample of the process gas. Then practically the height of the recorder peak is proportional to the volume percentage of hydrogen in the process gas.

If it is desired to measure inerts in the process gas, the carrier used is hydrogen. The hardware and scrubber liquid are identical to that used previously. In this case, after absorption of the chlorine from a sample slug the gases remaining are the same as before, but they bear a different relation to the carrier. The hydrogen remaining from the sample is identical to the hydrogen carrier and the inerts such as air and carbon dioxide have roughly one-tenth the thermal conductivity of the hydrogen carrier. Thus the unbalance of the thermal conductivity cell resulting when a sample slug reaches it is proportional to the (fixed) sample size, the (fixed) difference between the inerts and the hydrogen carrier, and the (variable) concentration of inerts in the original sample of the process gas. The "sign" of the difference in thermal conductivity is now opposite to that in the case of measuring hydrogen, so the recorder polarity is reversed and the height of the peak is now proportional to the volume percentage of inerts in the process gas.

For these applications a gas batch sampling device made from 4 mm. ID glass tubing with 5 mm. enlargements for bubble separation is suitable. Height of the trap accumulator loop is about two inches. Projection of the accumulator discharge above the liquid is about one-fourth inch. The scrubber is made from glass tubing with an internal diameter of 4 mm. except the lower liquid feed leg is made with 2 mm. ID glass. There are five coils about two and one-half inches in diameter. For practical considerations there usually is an overflow drain on the scrubber set at the height of the liquid in the sketch, and a filling hole. Scrubber liquid may be changed every few days, or a very small constant trickle of scrubber fluid may be flowed through the container. Head space of the scrubber container is not part of the carrier gas flow path, so it need not be sealed.

In some instances, the process gas may be available under pressures above atmospheric. Then the falling liquid pump is unnecessary; however, the batch sampling device may still be used by controlling the flow of gaseous sample to it at a small and fairly constant rate. The container is filled to the proper level with a liquid of low volatility and low viscosity and operation is no different from the case where liquid accompanies the sample gas.

The thermal conductivity cell, its power supply, and the recorder are typical of those used in thermal conductivity type gas chromatographs.

What is claimed is:

1. Apparatus for monitoring the amount of contaminant in a chlorine stream, comprising a gas batch sampling device having a carrier gas input and a chlorine and liquid input and a gas output, said sampling device being adapted to periodically discharge predetermined amounts of gas from said output, means coupling a source of carrier gas input and means for coupling chlorine and a liquid in which chlorine is insoluble to said chlorine and liquid input, chlorine gas scrubber means having an input and output, said gas output of said gas batch sampling device being coupled to said input of said scrubber means, a thermal conductivity cell having a sample input section, a reference input section, an electrical output signal means whose signal is a function of a thermal conductivity imbalance between gases applied to said reference and sample inputs, means for electrically energizing said conductivity cell, readout means coupled to said output signal means, means coupling said output of said scrubber means to the sample input section of said conductivity cell, and means coupling said source of carrier gas to said reference input section of said conductivity cell.

2. Apparatus in accordance with claim 1, wherein said means for coupling chlorine and a liquid includes a falling liquid pump device.

3. Apparatus in accordance with claim 1, wherein said source of carrier gas has flow regulating means coupled thereto.

4. Apparatus in accordance with claim 1, wherein said readout device is a chart recorder device.

5. Apparatus in accordance with claim 1, wherein said liquid in which chlorine is insoluble is brine.

6. Apparatus in accordance with claim 1, wherein said scrubbing means is a gas-lift type scrubber.

7. Apparatus in accordance with claim 1, wherein said carrier gas is air.

8. Apparatus in accordance with claim 1, wherein said carrier gas is nitrogen.

9. Apparatus in accordance with claim 1, wherein said carrier gas is hydrogen.

References Cited

UNITED STATES PATENTS

| | | | |
|---|---|---|---|
| 2,489,893 | 11/1949 | Johnson | 55—255 |
| 2,556,832 | 6/1951 | Vollrath | 55—270 |
| 3,150,516 | 9/1964 | Linnenbom | 73—19 |

RICHARD C. QUEISSER, Primary Examiner

C. E. SNEE, Assistant Examiner

PO-1050
(5/69)

UNITED STATES PATENT OFFICE
CERTIFICATE OF CORRECTION

Patent No. 3,474,661         Dated October 28, 1969

Inventor(s) W. F. Gerdes

It is certified that error appears in the above-identified patent and that said Letters Patent are hereby corrected as shown below:

In Column 4, line 58, insert after the word gas --to said carrier gas--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents